(12) United States Patent
Shimizu

(10) Patent No.: US 10,479,193 B2
(45) Date of Patent: Nov. 19, 2019

(54) GRILLE SHUTTER DEVICE

(71) Applicant: TOYOTA JIDOSHA KABUSHIKI KAISHA, Toyota-shi (JP)

(72) Inventor: Tatsuya Shimizu, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/262,995

(22) Filed: Jan. 31, 2019

(65) Prior Publication Data

US 2019/0241062 A1    Aug. 8, 2019

(30) Foreign Application Priority Data

Feb. 2, 2018   (JP) ................................. 2018-017347

(51) Int. Cl.
   *B60K 11/08*  (2006.01)
   *B60K 11/04*  (2006.01)
   *F01P 7/10*   (2006.01)

(52) U.S. Cl.
   CPC ............ *B60K 11/085* (2013.01); *B60K 11/04* (2013.01); *F01P 7/10* (2013.01)

(58) Field of Classification Search
   CPC ........... B60K 11/085; B60K 11/04; F01P 7/10
   See application file for complete search history.

(56) References Cited

U.S. PATENT DOCUMENTS

| 6,979,050 | B2 * | 12/2005 | Browne | B62D 35/00 296/180.5 |
| 6,991,280 | B2 * | 1/2006 | McKnight | B60K 11/085 296/180.1 |
| 7,059,664 | B2 * | 6/2006 | Aase | B60K 11/085 244/201 |
| 7,118,652 | B2 * | 10/2006 | McKnight | B62D 35/00 296/180.5 |
| 7,147,269 | B2 * | 12/2006 | Aase | B60K 11/085 296/180.1 |
| 7,147,271 | B2 * | 12/2006 | Aase | B60K 11/085 296/180.5 |
| 7,178,859 | B2 * | 2/2007 | Browne | B62D 35/00 296/180.5 |

(Continued)

FOREIGN PATENT DOCUMENTS

| EP | 2457761 A1 * | 5/2012 | ........... B60K 11/085 |
| JP | 2015-214211 | 12/2015 | |
| JP | 2016-188046 | 11/2016 | |

*Primary Examiner* — Jacob B Meyer
(74) *Attorney, Agent, or Firm* — Oblon, McClelland, Maier & Neustadt, L.L.P.

(57) ABSTRACT

A grille shutter device includes a decorative surface curved in a convex shape toward a front side of a vehicle in a vehicle width direction of a vehicle front portion and provided with an opening in a part; and a fin provided in the opening and configured to rotate about a shaft so as to open and close the opening. In the open state in which the opening is opened, a tip end on a front portion of the fin in a front-rear direction of the vehicle is in a linear shape as viewed from the front side of the vehicle, and in the closed state in which the opening is closed, an opposing tip end on the opposite side of the fin from the tip end is enlarged in the vehicle width direction to form a curve in a convex shape toward the front side of the vehicle.

5 Claims, 9 Drawing Sheets

(56) References Cited

U.S. PATENT DOCUMENTS

| | | | | |
|---|---|---|---|---|
| 7,429,074 B2* | 9/2008 | McKnight | B60K 11/085 | 296/180.1 |
| 7,498,926 B2* | 3/2009 | Browne | B60K 11/085 | 123/41.06 |
| 7,703,839 B2* | 4/2010 | McKnight | B60K 11/085 | 296/180.5 |
| 7,717,208 B2* | 5/2010 | Knauer | B60K 11/085 | 180/68.1 |
| 8,316,974 B2* | 11/2012 | Coel | B60K 11/085 | 165/44 |
| 8,550,887 B2* | 10/2013 | Walters | B60K 11/085 | 454/155 |
| 8,561,739 B2* | 10/2013 | Hori | B60K 11/085 | 180/68.1 |
| 8,640,802 B2* | 2/2014 | Schneider | B60K 11/085 | 123/41.04 |
| 10,183,573 B1* | 1/2019 | Klop | B60K 11/08 | |
| 10,293,681 B2* | 5/2019 | Vacca | B60K 11/085 | |
| 2005/0121240 A1* | 6/2005 | Aase | B60K 11/085 | 180/68.1 |
| 2005/0121946 A1* | 6/2005 | McKnight | B60K 11/085 | 296/180.1 |
| 2005/0230546 A1* | 10/2005 | McKnight | B60K 11/085 | 244/124 |
| 2006/0202508 A1* | 9/2006 | Aase | B60K 11/085 | 296/180.1 |
| 2006/0214469 A1* | 9/2006 | Aase | B60K 11/085 | 296/180.5 |
| 2006/0267376 A1* | 11/2006 | McKnight | B60K 11/085 | 296/180.5 |
| 2008/0073920 A1* | 3/2008 | Knauer | B60K 11/085 | 293/115 |
| 2008/0133090 A1* | 6/2008 | Browne | B60K 11/085 | 701/49 |
| 2008/0257286 A1* | 10/2008 | Harich | B60K 11/085 | 123/41.12 |
| 2009/0001675 A1* | 1/2009 | Higashi | B60K 11/04 | 277/650 |
| 2011/0203861 A1* | 8/2011 | Charnesky | B60K 11/085 | 180/68.1 |
| 2015/0321548 A1 | 11/2015 | Hori et al. | | |
| 2017/0096060 A1* | 4/2017 | Povinelli | B60K 11/085 | |
| 2018/0126841 A1* | 5/2018 | Vacca | B60K 11/085 | |
| 2019/0023119 A1* | 1/2019 | Klop | B60K 11/08 | |
| 2019/0126742 A1* | 5/2019 | Kondo | B60K 11/085 | |

* cited by examiner

GRILLE SHUTTER DEVICE

INCORPORATION BY REFERENCE

The disclosure of Japanese Patent Application No. 2018-017347 filed on Feb. 2, 2018 including the specification, drawings and abstract is incorporated herein by reference in its entirety.

BACKGROUND

1. Technical Field

The present disclosure relates to a grille shutter device.

2. Description of Related Art

A grille shutter device is disclosed in Japanese Unexamined Patent Application Publication No. 2016-188046 (JP 2016-188046 A). The grille shutter device includes a plurality of openings provided in a vehicle front portion and opened in a front-rear direction of a vehicle, and a plurality of fins to open and close the openings. When the openings are shifted from the closed state to the open state, the openings are opened by moving the fins toward the front side of the vehicle and the upper side of the vehicle by a drive mechanism. On the other hand, when the openings are shifted from the open state to closed state, the openings are closed by moving the fins toward the lower side of the vehicle and the rear side of the vehicle by the drive mechanism. As a result, the openings can be closed or opened in accordance with the operation state of a power unit or the like, so that air can be properly taken into the power unit room.

SUMMARY

Meanwhile, a vehicle front portion typically has a decorative surface in which the vehicle widthwise center portion (in this specification, the term of "center portion" also includes "substantially center portion") is curved in a convex shape toward the front side of the vehicle, and an opening for taking air into the power unit room is provided on the decorative surface. Therefore, it is desirable that the fins that open and close the openings are curved in a convex shape toward the front side of the vehicle along the decorative surface in the case of the closed state from the viewpoint of decorative appearance. However, when the fins curved in a convex shape toward the front side of the vehicle in the closed state are rotated about shafts to open the openings, the fins form curves in a convex shape toward one side in a vertical direction of the vehicle. In this case, since the fins are semicircular as viewed from the front side of the vehicle, the decorative appearance is deteriorated. Even if the fins are configured otherwise to be in a linear shape as viewed from the front side of the vehicle (in this specification, the term "linear shape" also includes "substantially linear shape") so as to make the fins look more natural in the open state, in a case where the fins are rotated about the shafts such that the openings are in the closed state, the decorative surface curved in a convex shape toward the front side of the vehicle and the flat fin form an appearance without continuity. As a result, the decorative appearance thereof is deteriorated. Therefore, there is room for further improvement over the related art in this respect.

The present disclosure provides a grille shutter device capable of improving decorative appearance.

A first aspect of the present disclosure relates to a grille shutter device. The grille shutter device includes a decorative surface curved in a convex shape toward a front side of a vehicle in a vehicle width direction of a vehicle front portion and provided with an opening in a part, and a fin provided in the opening and configured to rotate about a shaft having an axial direction extending in the vehicle width direction so as to open and close the opening. The fin is configured such that in the open state in which the opening is opened, a tip end on a front portion of the fin in a front-rear direction of the vehicle is in a linear shape as viewed from the front side of the vehicle, and in the closed state in which the opening is closed, an opposing tip end on the opposite side of the fin from the tip end is enlarged in the vehicle width direction so as to form a curve in a convex shape toward the front side of the vehicle in the vehicle width direction.

According to the first aspect, a fin is provided in an opening provided in a part of a decorative surface curved in a convex shape toward the front side of the vehicle in the vehicle width direction (in this application, the term "vehicle width direction" also includes "substantially vehicle width direction") of a vehicle front portion. The fin is configured to be rotatable about a shaft having an axial direction extending in the vehicle width direction and thus selectively switched between an open state in which the opening is opened and a closed state in which the opening is closed. The tip end of the fin on the front side of the vehicle in the open state is in a linear shape as viewed from the front side of the vehicle in the open state. Thus, when the inside of the grille shutter device is viewed from the outside of the vehicle through the opening, the fin in the open state looks more natural.

Meanwhile, the opposing tip end on the opposite side of the fin from the tip end is enlarged in the vehicle width direction and forms a curve in a convex shape toward the front side of the vehicle in the vehicle width direction in the closed state. Thus, the fin has an appearance continuous with the decorative surface of the vehicle front portion in the closed state. As a result, the fin looks more natural in both the open state and the closed state.

In the grille shutter device according to the first aspect, the fin may be made of an elastic body, and the fin may be configured such that the opposing tip end is stretched in the vehicle width direction when the fin is shifted from the open state to the closed state.

According to the above aspect, the fin is made of an elastic body, and is configured such that the opposing tip end is stretched in the vehicle width direction when the fin is shifted from the open state to closed state. Thus, deformation of the fin when shifted from the open state to the closed state can be performed continuously and smoothly.

In the grille shutter device according to the first aspect, the opposing tip end may include a bellows configured to fold the opposing tip end in a thickness direction of the fin.

According to the above aspect, the tip end of the fin includes a bellows in which the opposing tip end is folded in the thickness direction of the fin. Thus, stretching the bellows allows the enlarged amount of the tip end in the vehicle width direction to be increased. Thus, even if the opening is provided in a decorative surface having a large curvature, the fin in the closed state is allowed to have an appearance continuous with the decorative surface of the vehicle front portion (in this specification, the term "continuous" includes "substantially continuous").

In the grille shutter device according to the first aspect, the fin may include a guide configured to hold the vehicle widthwise outer portion of the fin, and the guide may be configured to guide the fin toward the front side of the vehicle as the opposing tip end of the fin approaches a vehicle widthwise inner portion.

According to the above aspect, the fin includes a guide configured to hold the vehicle widthwise outer portion of the fin. The guide is configured to guide the fin toward the front side of the vehicle (the term "front side of vehicle" includes "substantially front side of vehicle") as the fin approaches the vehicle widthwise inner portion in the closed state. Thus, it is ensured that the fin is curved along the decorative surface in the closed state.

According to the first aspect, the grille shutter device has an excellent effect of improving decorative appearance.

According to the above aspect, the grille shutter device further has an excellent effect of stabilized operation.

According to the above aspect, the grille shutter device further has an excellent effect of improving the degree of freedom in design.

According to the above aspect, the grille shutter device further has an excellent effect of further improving decorative appearance.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

First Embodiment

Hereinafter, a grille shutter device 10 according to an embodiment of the present disclosure will be described with reference to FIGS. 1 to 6. In each of the drawings, the arrow FR, the arrow UP, and the arrow OUT provided as needed indicate the front direction (advancing direction) of the vehicle, the upward direction, and the outside in the vehicle width direction, respectively. Hereinafter, in a case where explanation is provided simply with terms such as front-rear, right-left, vertical direction, it should be considered that the front and rear sides in the front-rear direction of the vehicle, the right and left sides in the right-left direction of the vehicle (vehicle width direction), the upper and lower sides in the vertical direction of the vehicle are indicated, unless otherwise specified.

Overall Structure

Figure 1:
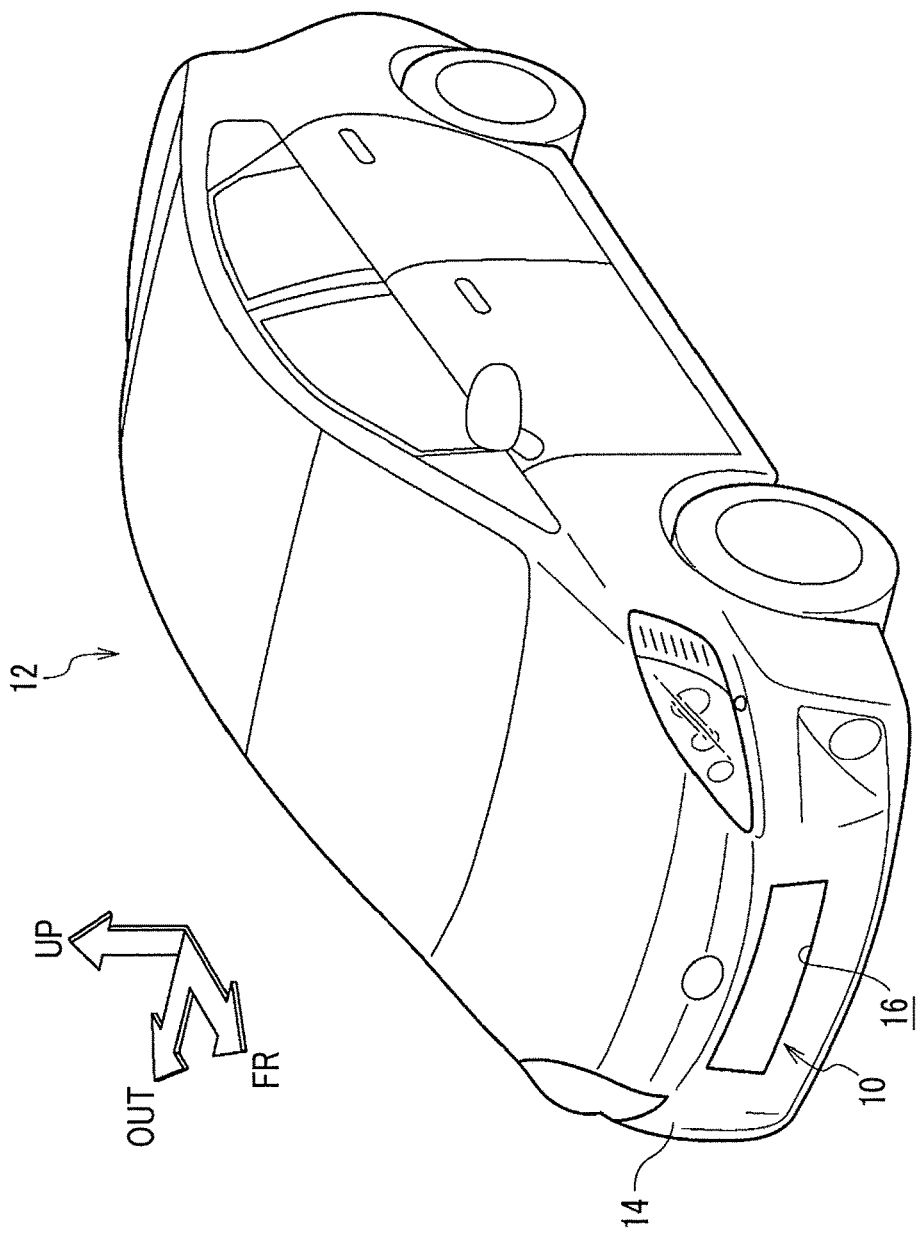
FIG. 1 is a schematic perspective view showing a vehicle having a grille shutter device according to a first embodiment.

As shown in FIG. 1, a front bumper cover 14 is provided in the front portion of a vehicle 12. The front bumper cover 14 constitutes a part of the decorative surface of the vehicle exterior and covers a front bumper absorber and front bumper reinforcement (both not shown) from the front side of the vehicle. The decorative surface of the vehicle front portion of the vehicle 12 is curved in a convex shape toward the front side of the vehicle in the vehicle width direction. Further, the front bumper cover 14 is made thin with resin, for example.

On the lower portion of the front bumper cover 14 in the vertical direction of the vehicle, a grille shutter device 10 is provided. The grille shutter device 10 has an opening 16 and a fin 18 (see FIG. 2).

The opening 16 is formed in the front bumper cover 14, and is opened in the front-rear direction of the vehicle. The opening 16 extends in the vehicle width direction, specifically, a rectangular shape of which the longitudinal direction is the vehicle width direction as viewed from the front (the term "rectangular shape" includes "substantially rectangular shape"). The center of the opening 16 in the vehicle width direction is disposed to be at the same position as the center of the front bumper cover 14 in the vehicle width direction. A frame 20 (see FIG. 2) is disposed behind the opening 16 in the vehicle front-rear direction and in a rectangular frame shape (the term "rectangular frame shape" includes "substantially rectangular frame shape") so as to surround the opening 16.

Fin

Figure 2:
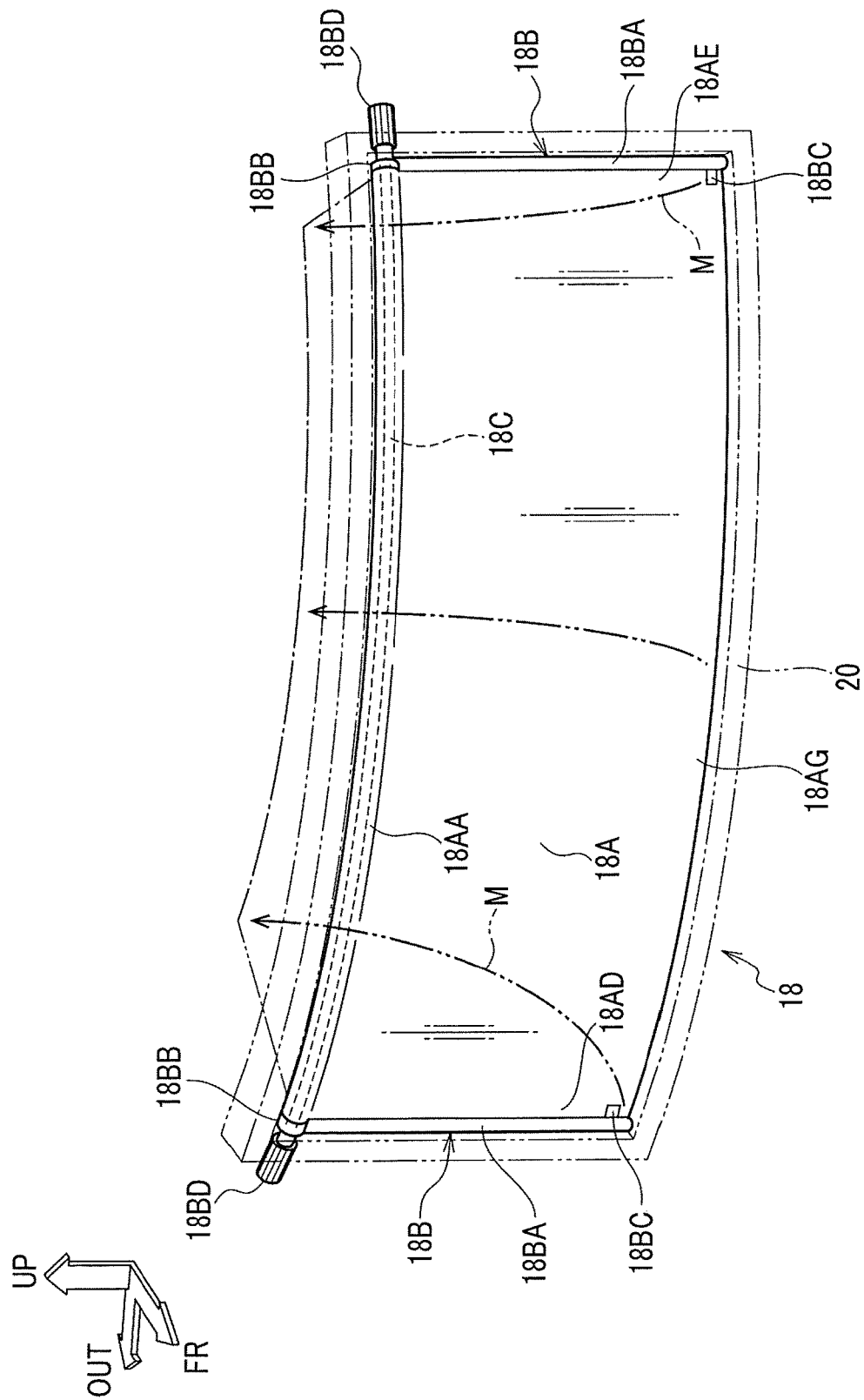
FIG. 2 is a schematic perspective view showing main components of the grille shutter device according to the first embodiment.
Figure 3:
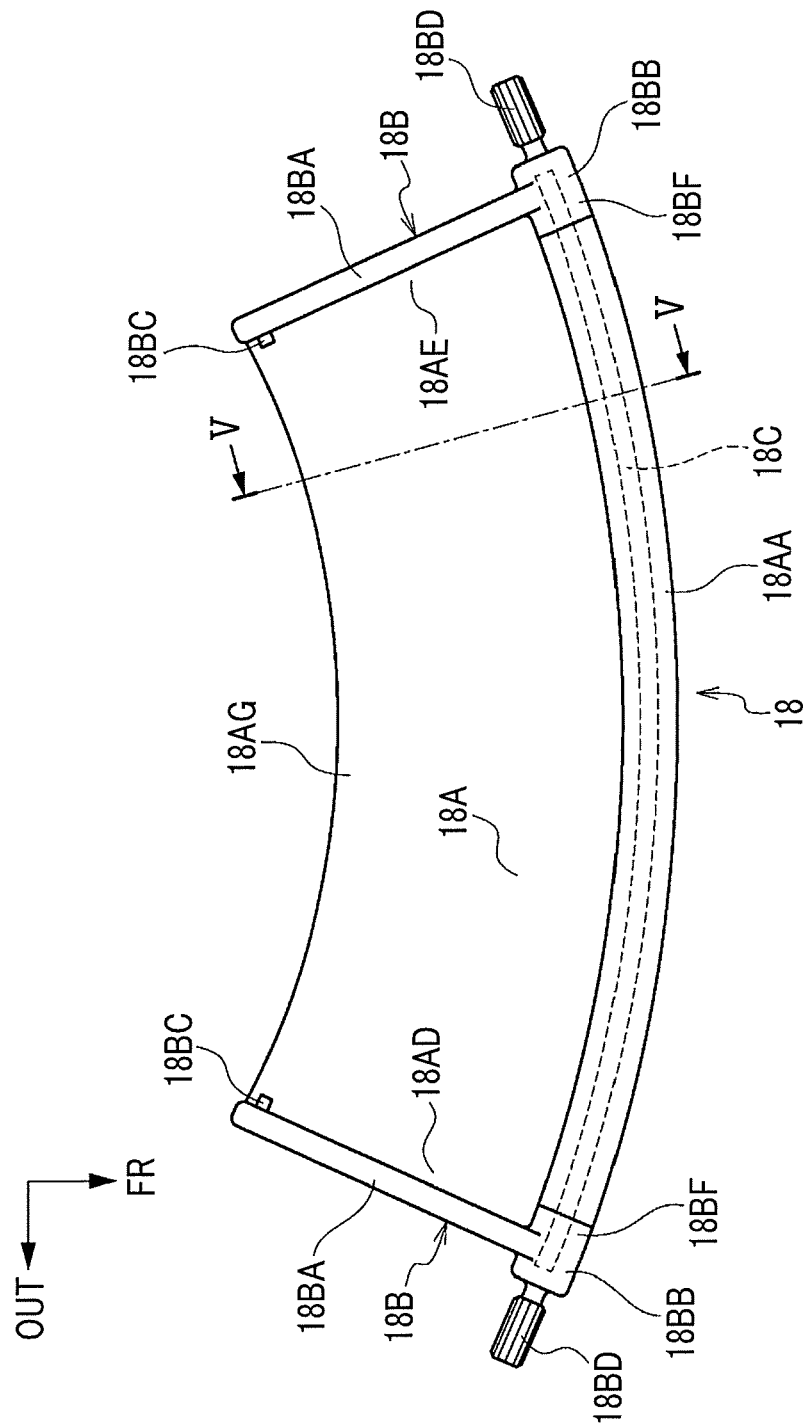
FIG. 3 is a plan view of the vehicle showing the main components of the grille shutter device according to the first embodiment in an open state.

As shown in FIG. 2, a fin 18 is provided inside the opening 16. The fin 18 has a fin body 18A, a fin support member 18B, and a shaft 18C. Details of each part will be described below.

Fin Body

The fin body 18A is formed in a rectangular plate shape of which the longitudinal direction is the vehicle width direction (in this specification, the term "rectangular plate shape" includes "substantially rectangular plate shape"). The fin body 18A is made of an elastic body such as rubber and is in a state of being curved so as to be in a convex shape in the vehicle width direction toward the front side of the vehicle along the decorative surface. This state of the fin 18 is an example of the "closed state". The fin body 18A is set to be slightly smaller than the opening 16 (see FIG. 1) in the closed state.

A shaft accommodating portion 18AA in which the shaft 18C is accommodated is provided at the end portion positioned upward in the vertical direction of the vehicle (end portion on one side in the short-length direction) as the tip end of the fin 18 in the closed state. Similar to the fin body 18A, the shaft accommodating portion 18AA is made of an elastic body such as rubber, and a cylindrical shaft accommodating space 18AB is formed in the shaft accommodating portion 18AA (see FIG. 5).

Fin Support Member

Figure 6:
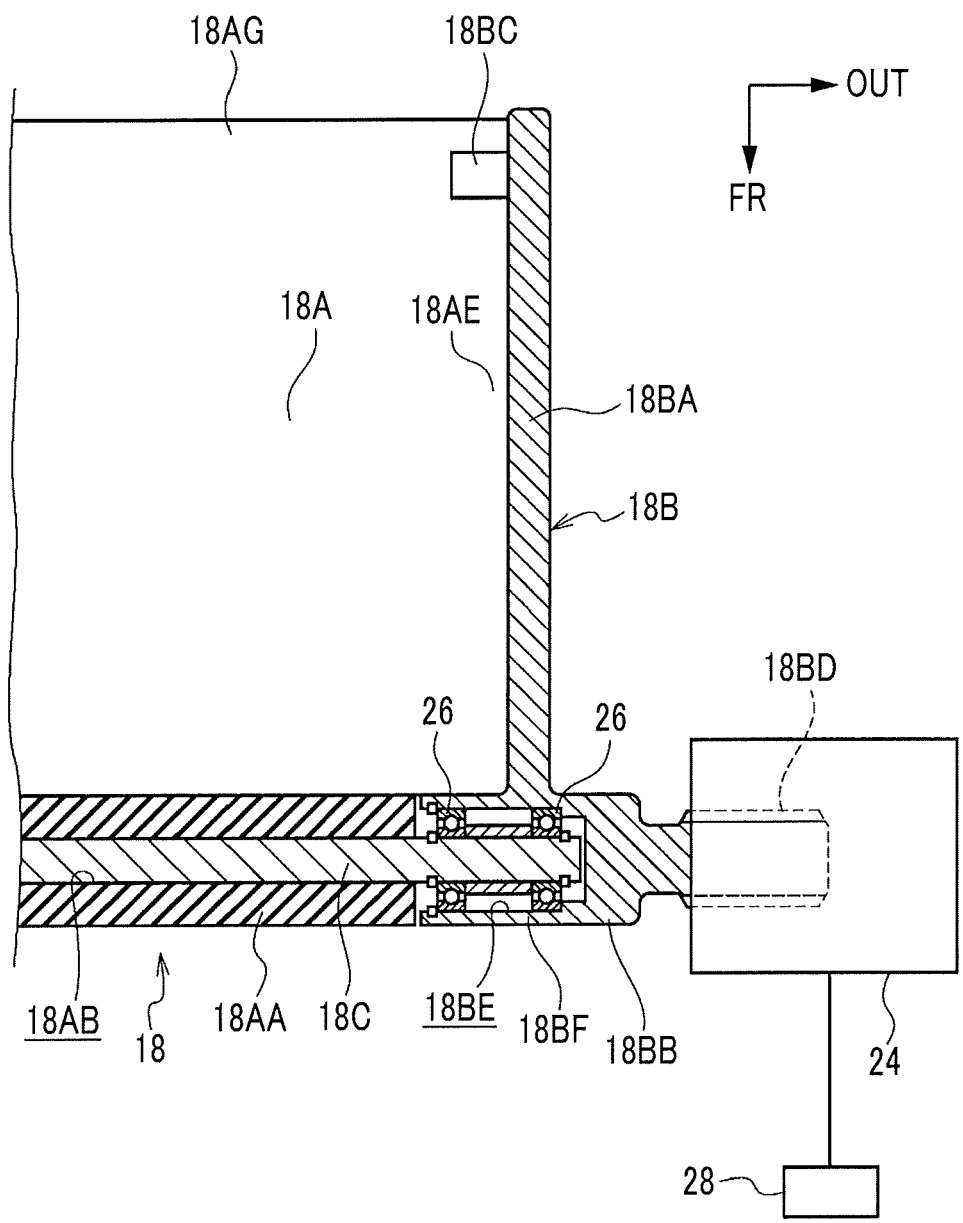
FIG. 6 is an enlarged sectional view taken along a line VI-VI in FIG. 4.

A pair of end portions 18AD, 18AE is provided in the vehicle width direction of the fin body 18A, and a fin support member 18B is attached to each of the end portions 18AD, 18AE. The fin support member 18B is made of a rigid material such as resin, and includes a fin support 18BA, a drive shaft 18BB, and a guide 18BC, as shown in FIG. 6. The fin support 18BA is formed in an elongated shape along the short-length direction of the fin body 18A, and the end portions 18AD, 18AE of the fin body 18A are joined to the fin support 18BA by a not shown joining method (FIG. 6 depicts only end portion 18AE side).

The drive shaft 18BB is formed on a first end side in the longitudinal direction of the fin support 18BA, and includes a gear portion 18BD formed so as to protrude outward in the vehicle width direction and a drive shaft body 18BF having a hollow 18BE to be described later. The gear portion 18BD is formed in a columnar shape having an axial direction extending in the vehicle width direction, and a gear for transmitting the driving force from an actuator 24 to be described later is provided on the outer peripheral surface of the gear portion 18BD (see FIG. 6).

A cylindrical hollow 18BE having an axial direction extending in the vehicle width direction is formed in the drive shaft body 18BF. An end portion in the longitudinal direction of the shaft 18C is inserted into the hollow 18BE, and the shaft 18C is rotatably held by a plurality of bearings 26 provided in the hollow 18BE. As the fin support member 18B rotates, the fin body 18A and eventually the fin 18 open and close the opening 16 (see FIG. 2).

The guide 18BC is provided on a second end side in the longitudinal direction of the fin support 18BA and is formed so as to protrude inward in the vehicle width direction and toward the front side of the vehicle. The guide 18BC is formed in pairs interposing the fin body 18A so as to displaceably hold the opposing tip end 18AG of the fin body 18A.

Shaft

Figure 4:
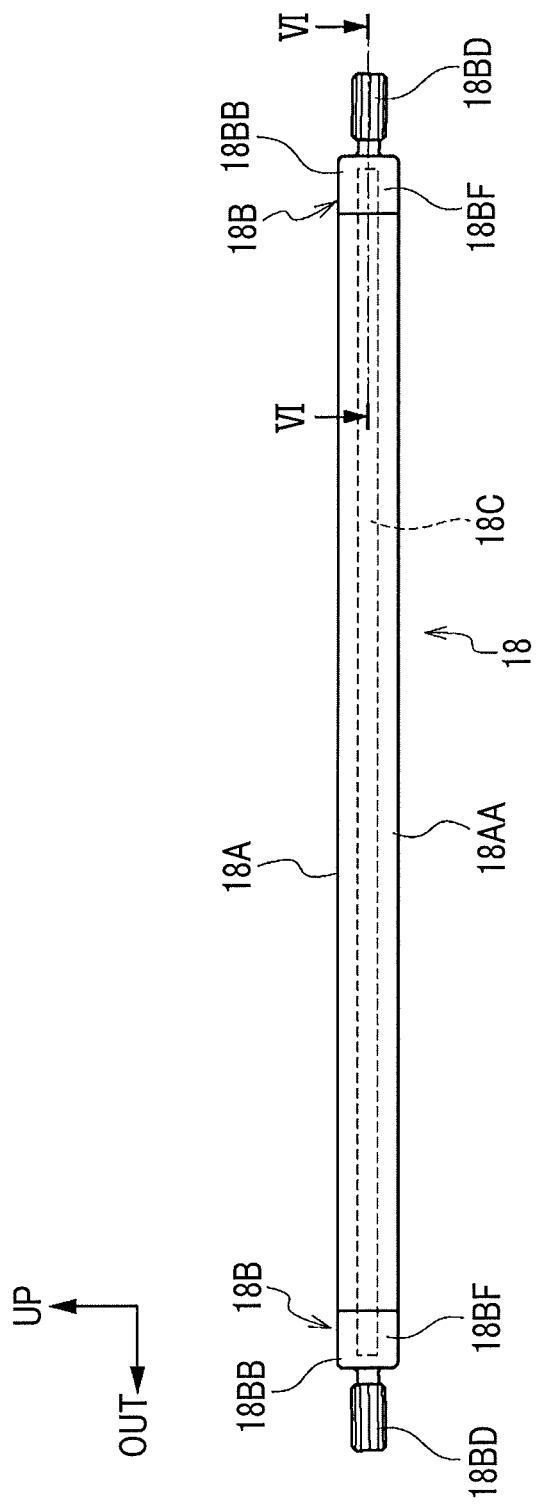
FIG. 4 is a front view of the vehicle as viewed from the front side of the vehicle with respect to FIG. 3.
Figure 5:
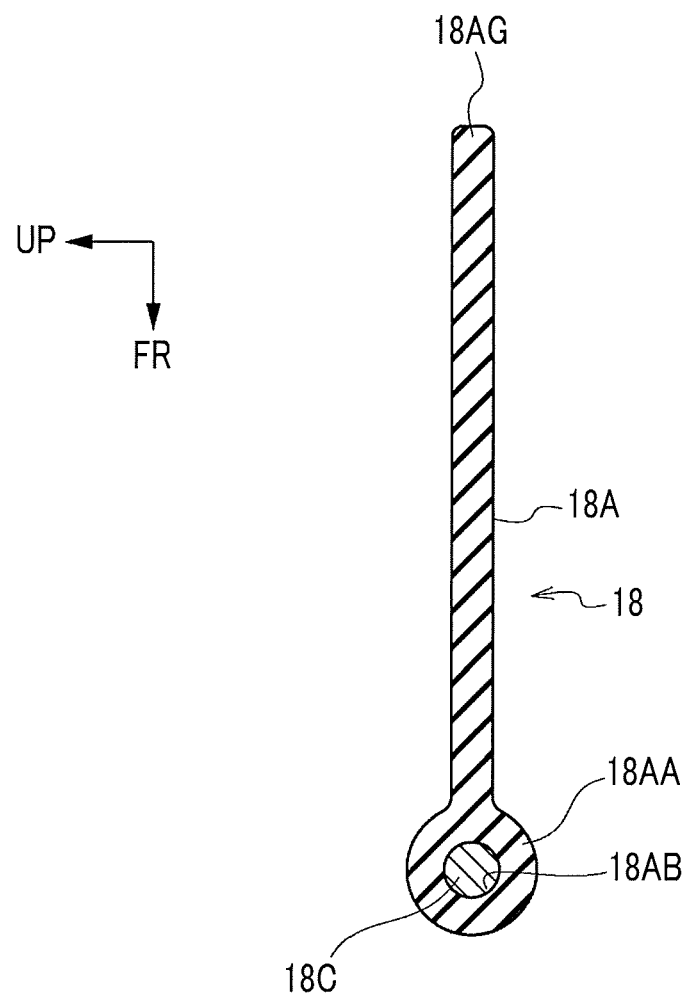
FIG. 5 is an enlarged cross-sectional view taken along a line V-V in FIG. 3.

As shown in FIG. 2, the shaft 18C is disposed closer to the upper portion of the opening 16 in the vertical direction of the vehicle, and the vehicle widthwise center portion is curved in a convex shape toward the front side of the vehicle along the shape of the opening 16. Thus, on a pair of right and left fin support members 18B provided at the longitudinal end portions of the shaft 18C, when the fin supports 18BA extending along the vertical direction of the vehicle (in closed state) are rotated to the rear side of the vehicle as shown by arrow M in FIG. 2, the tip ends of the fin supports 18BA come close to each other (see FIG. 3). Then, once the fin body 18A is shifted from the closed state to the open state, the opposing tip end 18AG is contracted by the elastic force (see single-dot chain line in FIG. 2, and FIG. 3). In other words, when the fin body 18A is shifted from the open state to the closed state, the opposing tip end 18AG is enlarged in the vehicle width direction against the elastic force. In the closed state, the fin body 18A is curved in a convex shape toward the front side of the vehicle in the vehicle width direction following the curve of the shaft 18C around the shaft accommodating portion 18AA. Further, the guide 18BC of the fin support 18BA (see FIG. 6) also guides the opposing tip end 18AG of the fin body 18A to be curved in a convex shape toward the front side of the vehicle in the vehicle width direction. The state in which the fin support 18BA extends in a horizontal direction (in this specification, the term "horizontal" includes "substantially horizontal"), that is, the state in which the fin body 18A extends horizontally toward the rear side as shown in FIG. 4 is an example of the "open state". That is, the shaft accommodating portion 18AA as the tip end of the fin 18 positioned forward in the front-rear direction of the vehicle in the open state, is formed in a linear shape along the horizontal direction as viewed from the front side of the vehicle.

Actuator

As shown in FIG. 6, the actuator 24 is provided on the vehicle widthwise outer portion of the drive shaft 18BB. The actuator 24 has a rotating shaft (not shown) rotatable about the vehicle width direction as the axial direction of the shaft, and is electrically connected to the control device 28. The control device 28 is mainly made of a computer equipped with a well-known central processing unit (CPU), read only memory (ROM), random access memory (RAM) (none of which are shown), and the like, and a temperature sensor of a power unit coolant and a vehicle speed sensor (both not shown) are connected to the input side of the control device 28. Meanwhile, the actuator 24 is connected to the output side of the control device 28.

Functions and Effects of First Embodiment

Next, the functions and effects of the first embodiment will be described.

Here, the functions and effects of the present embodiment will be described using a comparative example shown in FIGS. 7 and 8. The same components as those of the present embodiment are denoted by the same reference numerals, and description thereof will be omitted.

Figure 7:
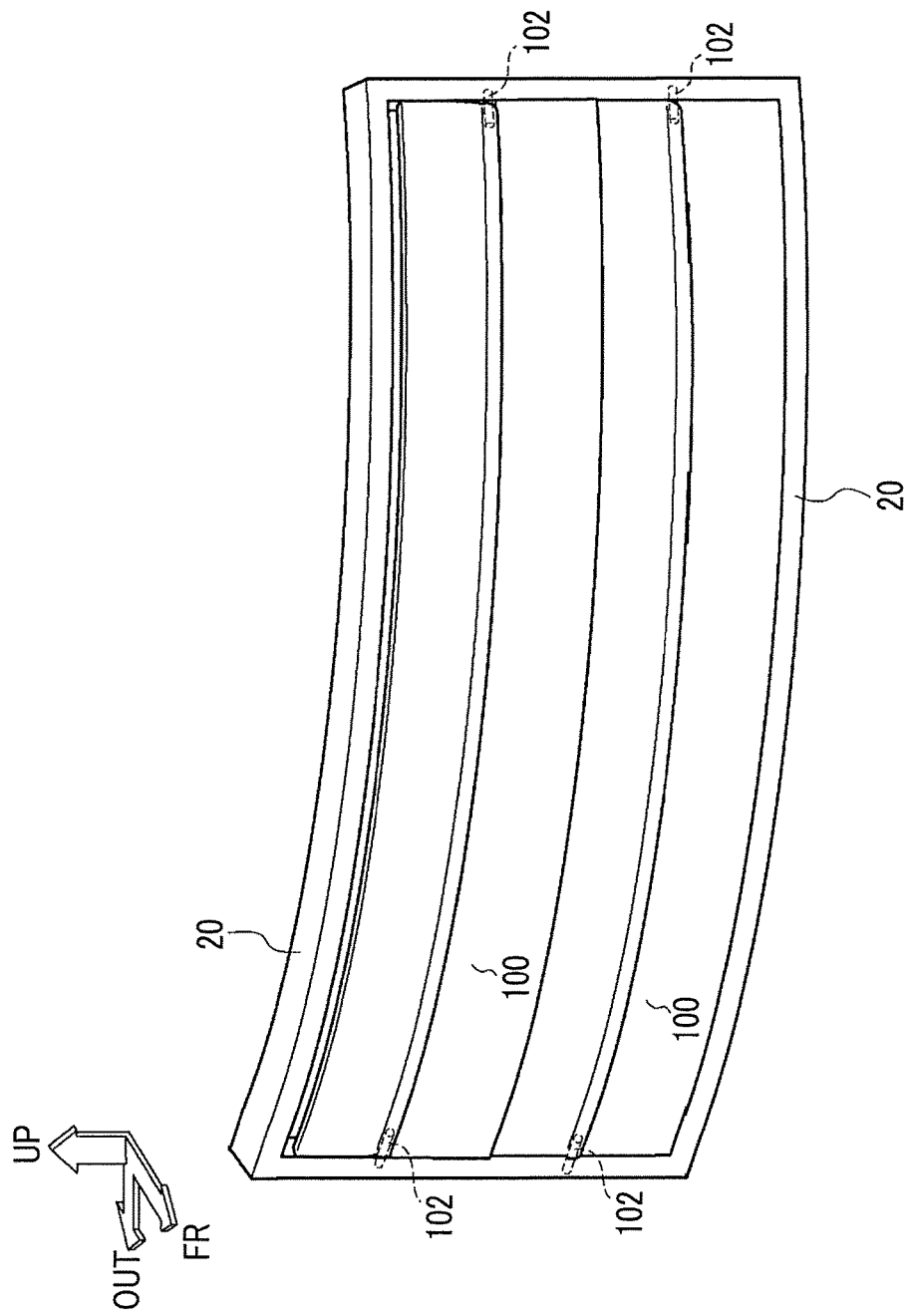
FIG. 7 is a schematic perspective view showing a grille shutter device according to a comparative example in a closed state.
Figure 8:
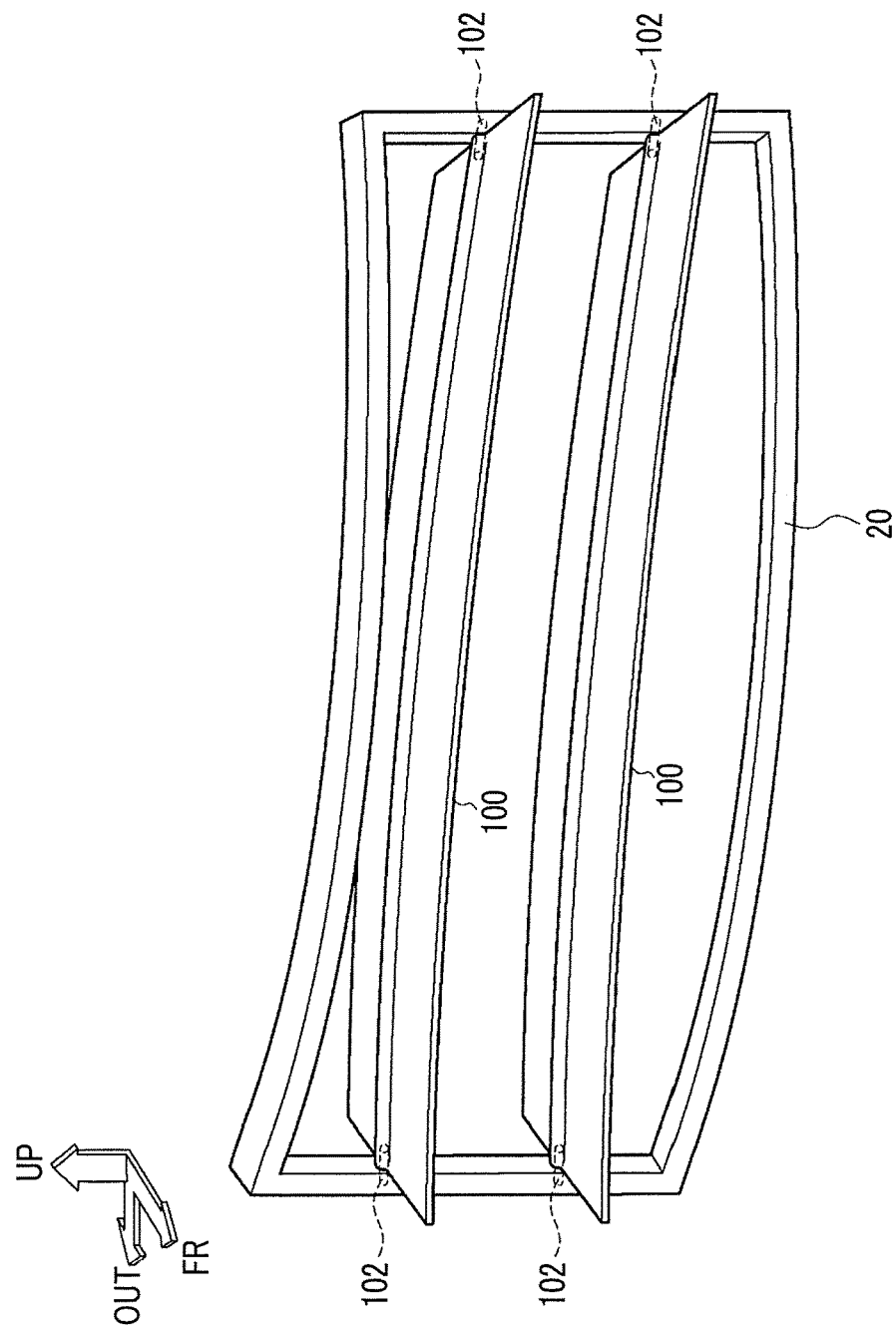
FIG. 8 is a schematic perspective view showing the grille shutter device according to the comparative example in an open state.

As shown in FIG. 7, a plurality of fins 100 is provided in a frame 20 provided behind the opening 16 in the vehicle front-rear direction (see FIG. 1). Each of the fins 100 is formed in a rectangular plate shape of which the longitudinal direction is the vehicle width direction, and shafts 102 having an axial direction extending in the longitudinal direction are provided on the center portion in the short-length direction of the fin 100. Holding the shafts 102 as the center, the fins 100 can be selectively switched between the closed state in which the opening 16 is closed as shown in FIG. 7 and the open state in which the opening 16 is opened (see FIG. 8).

In the closed state, the fin 100 forms a curve in a convex shape toward the front side of the vehicle in the vehicle width direction along the decorative surface of the front portion of the vehicle 12. As a result, it is possible to improve decorative appearance when the opening 16 is in the closed state. However, when the fins 100 curved in a convex shape toward the front side of the vehicle in the closed state are rotated about shafts 102 as shown in FIG. 8 to open the openings, the fins curved in a convex shape is turned toward one side in the vertical direction of the vehicle (toward upper side of the vehicle in this figure). In this case, the fins 100 extend in a direction different from that of the opening 16 extending in the vehicle width direction, and the fins 100 look semicircular as viewed from the front side of the vehicle (the term "semicircular" include "substantially semicircular") so that the fins 100 become easily noticeable from the openings 16. Thus, the decorative appearance in the open state is deteriorated. Even if the fins 100 are configured to be in a linear shape instead as viewed from the front side of the vehicle (in this specification, the term "linear shape" also includes "substantially linear shape") so as to make the fins look more natural in the open state, in the case where the fins 100 are rotated about the shafts 102 such that the openings 16 are in the closed state, the decorative surface curved in a convex shape toward the front side of the vehicle and the fins 100 form an appearance without continuity (not shown). As a result, the decorative appearance thereof is deteriorated.

On the other hand, in the present embodiment, as shown in FIG. 2, the fin 18 is provided in the opening 16 provided in a part of the decorative surface curved in a convex shape toward the front side of the vehicle in the vehicle width direction of the vehicle front portion as shown in FIG. 1. The fin 18 is configured to be rotatable about the shaft 18C having an axial direction extending in the vehicle width direction and selectively switched between the open state in which the opening 16 is opened (see single-dot chain line in FIG. 2) and the closed state in which the opening 16 is closed (see solid line in FIG. 2). As shown in FIG. 4, the shaft accommodating portion 18AA and the opposing tip end 18AG of the fin 18 are in a linear shape as viewed from the front side of the vehicle in the open state. Thus, when the inside of the grille shutter device is viewed from the outside of the vehicle through the opening 16 in the open state, the fin 18 looks more natural.

Meanwhile, in the closed state, the opposing tip end 18AG of the fin 18 is enlarged in the vehicle width direction and forms a curve in a convex shape toward the front side of the vehicle in the vehicle width direction. Thus, in the closed state, the fin 18 has an appearance continuous with the decorative surface of the vehicle front portion. As a result, the fin 18 becomes more natural in both the open state and the closed state. With this configuration, it is possible to improve the decorative appearance.

Further, the fin 18 is made of an elastic body, and is configured such that the opposing tip end 18AG is stretched in the vehicle width direction in the closed state. Thus, deformation of the fin 18 when shifted from the open state to the closed state can be performed continuously and smoothly. As a result, operations of the grilled shutter device can be stabilized.

Further, the fin 18 includes a guide 18BC configured to hold the vehicle widthwise outer portion of the fin 18. The guide 18BC is configured to guide the fin 18 toward the front side of the vehicle as the fin 18 approaches the vehicle widthwise inner portion in the closed state. Thus, it is ensured that the fin 18 is curved along the decorative surface in the closed state. As a result, it is possible to further improve the decorative appearance.

Second Embodiment

Next, a grille shutter device according to a second embodiment of the present disclosure will be described with reference to FIG. 9. The same components as those of the above-described first embodiment and the like are denoted by the same reference numerals, and description thereof will be omitted.

The basic structure of the grille shutter device 39 according to the second embodiment of the present disclosure is the same as that of the first embodiment, and a bellows 40AB is provided on a fin body 40A.

Figure 9:
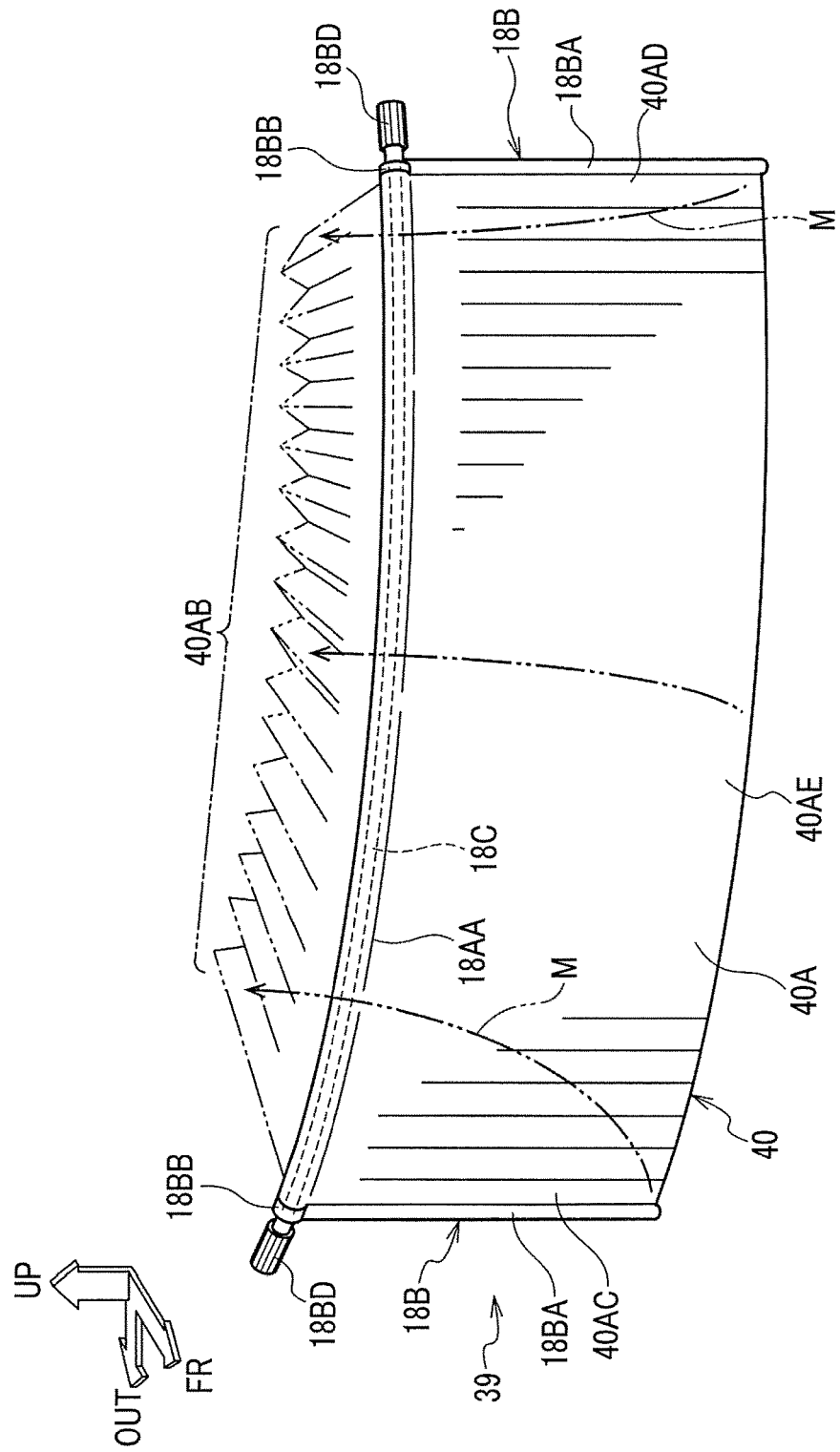
FIG. 9 is a schematic perspective view showing main components of a grille shutter device according to a second embodiment.

That is, as shown in FIG. 9, a fin 40 is provided inside the opening 16 (see FIG. 1). The fin 40 has a fin body 40A, the fin support member 18B, and the shaft 18C. The fin body 40A is formed in a rectangular plate shape of which the longitudinal direction is the vehicle width direction. The fin body 40A is made of resin and similar to the decorative surface, the fin body 40A is in a state of being curved to have a convex shape toward the front side of the vehicle in the vehicle width direction (see the solid line in FIG. 9). This state of the fin 40 is an example of the "closed state". The fin body 40A is set to a size slightly smaller than the opening 16 in the closed state. The fin body 40A is made of, though not limited to, resin and may be made of an elastic body such as rubber.

On the upper portion of the fin body 40A in the vertical direction of the vehicle in the closed state, the shaft accommodating portion 18AA in which the shaft 18C is accommodated is provided as the tip end of the fin. Further, a pair of end portions 40AC, 40AD is provided in the vehicle width direction of the fin body 40A, and the fin support member 18B is attached to each of the end portions 40AC, 40AD.

A bellows 40AB is provided on an opposing tip end 40AE on the opposite side of the fin 40 from the shaft accommodating portion 18AA. The bellows 40AB is formed in a shape vertically corrugating in the thickness direction of the fin body 40A. Thus, the fin body 40A can be stretched and contracted in the longitudinal direction (vehicle width direction) around the opposing tip end 40AE. Thus, a pair of right and left fin supports 18BA is rotated from a state in which the fin supports 18BA extend along the vertical direction of the vehicle (in closed state) to the rear side of the vehicle as shown by arrow M in FIG. 9, the tip ends of the fin supports 18BA come close to each other. That is, when the fin body 40A is shifted from the closed state to the open state, the bellows 40AB is contracted in the vehicle width direction, and the opposing tip end 40AE is contracted as well (see double-dot chain line in FIG. 9). In other words, when the fin body 40A is shifted from the open state to the closed state, the bellows 40AB is stretched in the vehicle width direction, and the opposing tip end 40AE is thus enlarged in the vehicle width direction.

Functions and Effects of Second Embodiment

Next, the functions and effects of the second embodiment will be described.

Even with the above configuration, since the configuration is the same as that of the grille shutter device 10 of the first embodiment except that the bellows 40AB is provided on the fin body 40A, the same effect as in the first embodiment can be obtained. Further, since the opposing tip end 40AE of the fin 40 includes the bellows 40AB in which the opposing tip end is folded in the thickness direction of the fin 40, the amount of the opposing tip end 40AE to be enlarged in the vehicle width direction can be increased by stretching the bellows 40AB. Thus, even if the opening 16 is provided in a decorative surface having a large curvature, the fin 40 is allowed to have an appearance continuous with the decorative surface of the vehicle front portion in the closed state. As a result, the degree of freedom in design can further be improved.

Further, since the fin body 40A has the bellows 40AB, even if the fin body 40A is made of a material harder than rubber such as resin, the fin body 40A can be enlarged and contracted in the vehicle width direction. Therefore, by constituting the fin body 40A with a hard material, breakage resistance in a case where a foreign object such as stone hits the fin 40 when the opening 16 is closed can be improved.

In the first embodiment, although the fin body 18A is made of an elastic body such as rubber, an applicable embodiment of the present disclosure is not limited thereto, and the fin body may be made of a non-elastic body such as a steel plate, and may be configured to be divided in the vehicle width direction and overlapped and slid in the longitudinal direction of the fin so as to be enlarged in the vehicle width direction in the closed state or other configurations may also be adopted.

Further, although the fins 18, 40 are made of a single piece, an applicable embodiment of the present disclosure is not limited thereto, and a configuration in which a plurality of fins is disposed in the vertical direction or the vehicle width direction to open and close the openings 16 may also be adopted.

Furthermore, although the shaft 18C is provided at an end portion on one of the short-length direction of the fins 18, 40, an applicable embodiment of the present disclosure is not limited thereto, and a configuration in which the shaft 18C is provided at other positions such as the center portion in the short-length direction of the fins 18, 40 may also be adopted.

An applicable embodiment of the present disclosure is not limited to the above-described embodiments, and various modifications can be made without departing from the spirit of the present disclosure, in addition to the above embodiments.

What is claimed is:

1. A grille shutter device comprising:
    a decorative surface curved in a convex shape toward a front side of a vehicle in a vehicle width direction of a vehicle front portion and provided with an opening in a part; and
    a fin provided in the opening and configured to rotate about a shaft having an axial direction extending in the vehicle width direction so as to open and close the opening,
    wherein the fin is configured such that in an open state in which the opening is opened, a tip end on a front portion of the fin in a front-rear direction of the vehicle is in a linear shape as viewed from the front side of the vehicle, and in a closed state in which the opening is closed, an opposing tip end on an opposite side of the fin from the tip end is enlarged in the vehicle width direction relative to a width thereof in the open state so as to form a curve in a convex shape toward the front side of the vehicle in the vehicle width direction and wherein, in the open state and the closed state, the shaft is curved in a convex shape toward the front side of the vehicle in a top view of the vehicle.

2. The grille shutter device according to claim 1, wherein:
    the fin is made of an elastic body; and
    the fin is configured such that the opposing tip end is stretched in the vehicle width direction when the fin is shifted from the open state to the closed state.

3. The grille shutter device according to claim 1, wherein the opposing tip end includes a bellows configured to fold the opposing tip end in a thickness direction of the fin.

4. The grille shutter device according to claim 1, wherein:
    a guide is provided on an opposing tip end side of the fin and is configured to hold a vehicle widthwise outer portion of the opposing tip end of the fin; and
    the guide is configured to guide the fin toward the front side of the vehicle as the opposing tip end of the fin approaches a vehicle widthwise inner portion of the opening.

5. The grille shutter device according to claim 1, wherein:
    a fin support member is attached to each end portion of the fin in the vehicle width direction, each fin support member including a fin support extending along a short-length direction of the fin, and a drive shaft formed at a first end side in a longitudinal direction of the fin support;
    the drive shaft includes a gear portion transmitting a driving force from an actuator, and a drive shaft body including a hollow in which an end portion in a longitudinal direction of the shaft is inserted, and
    rotation of the fin support member moves the fin between the open state and the closed state.

* * * * *